(12) United States Patent
Hawketts

(10) Patent No.: US 6,578,268 B2
(45) Date of Patent: Jun. 17, 2003

(54) TOOL

(76) Inventor: Geoffrey Hawketts, 34 Terrace Ave., Morrinsville (NZ)

( * ) Notice: Subject to any disclaimer, the term of this patent is extended or adjusted under 35 U.S.C. 154(b) by 0 days.

(21) Appl. No.: 09/910,280

(22) Filed: Jul. 19, 2001

(65) Prior Publication Data

US 2003/0024127 A1 Feb. 6, 2003

(51) Int. Cl.[7] .............................. B23D 49/10
(52) U.S. Cl. .................. 30/166.3; 30/392; 30/517
(58) Field of Search .................. 30/392, 166.3, 30/517; 606/177

(56) References Cited

U.S. PATENT DOCUMENTS 2,724,417 A * 11/1955 Williams .................... 30/166.3
4,094,349 A    6/1978 Lajack et al.

FOREIGN PATENT DOCUMENTS

| AU | 128146 | 7/1948 |
|----|--------|--------|
| NZ | 197866 | 2/1985 |
| NZ | 212899 | 10/1987 |
| NZ | 222590 | 1/1990 |

* cited by examiner

Primary Examiner—Douglas D. Watts
(74) Attorney, Agent, or Firm—Brooks & Kushman P.C.

(57) ABSTRACT

A hand tool includes a replaceable cutting portion having an elongate cutting surface, a body and a handle. The body receives displaceable protecting apparatus for shielding the cutting surface of the cutting portion when not in use. A forward distal end of the protecting apparatus contacts a portion of the surface of the object to be cut such that when pressure is applied against the object surface displacement of the protecting apparatus relative to the replaceable cutting portion is effected to expose only as much of the cutting surface as needed to effect the required cut. Alignment means maintain alignment of the replaceable cutting portion relative to the protecting apparatus throughout the cutting. When the cutting action is completed resilience means facilitates return of the protecting apparatus so the cutting surface is no longer exposed.

40 Claims, 6 Drawing Sheets

TOOL

TECHNICAL FIELD

This invention relates to improvement in and relating to a tool.

In particular, the tool is a cutting tool. A portion of the cutting edge of the blade of the tool is presented for cutting only when a portion of the frame of the tool is displaced on contact with an object to be cut, such that only sufficient blade as required is exposed. When the cutting action has been completed, the guide or frame of the tool returns to a position whereby the cutting edge of the blade is no longer exposed.

It is envisaged the tool will have the most practical use for precise woodworking procedures in the form of an improved hacksaw tool, and so forth.

However, the invention may have applications outside this field.

BACKGROUND ART

A number of cutting tools, in the form of saws are available in the prior art. In a typical hacksaw or keyhole saw the-frame runs substantially parallel to the line of a narrow blade. Typically, the blade of such tools is replaced as the teeth of the blade become blunt through use, or the blade is broken. The keyhole saw is particularly useful for fret work, hobby or craft work where precise cuts are required. The bigger version of such a tool (being the standard hacksaw) is more bulky, but is typically used for a range of cutting procedures.

The advantage of a hacksaw or a keyhole saw is that the blade is replaceable when it becomes blunt or broken. This is an advantage over saws with fixed blades that when blunt require sharpening, or if they get bent or structurally damaged, the saw typically has to be thrown away.

Whilst the advantage of the hacksaw is its versatility, and the ability to replace the blades, it is nevertheless a cumbersome tool. Typically the frame supporting the blade can get in the way. Further, the whole blade is exposed generally, and in use is fully available for use in cutting. However, it becomes correspondingly easier to cut too deeply into a surface where fine control may be required or the cut may be wider than required. The same or similar problems are inherent in any tool, including awls or drills, where the depth of a hole being punched/drilled and such like can be difficult to control.

Therefore, it would be an advantage to have a tool that:

a) incorporated a replaceable portion such as a blade or an awl-like portion and so forth depending on the tool, and b) had the added feature of a guard which covered the cutting edge of the blade or the sharp end of the awl and so forth until the tool is used, and c) the guard only exposed so much of the blade/awl as required for a particular function thereby enabling greater control of the cutting action, minimising the likelihood of the cut/hole made being too deep (or where relevant, too wide); and d) the guard would not encroach on the work area and hinder the action of the saw/awl and so forth when in use; and e) the tool would be easy to use, easy to repair and easy to replace blades/tool shafts and so forth.

It is an object of the present invention to address the foregoing problems or at least to provide the public with a useful choice.

Further aspects and advantages of the present invention will become apparent from the ensuing description which is given by way of example only.

DISCLOSURE OF INVENTION

According to one aspect of the present invention there is provided a tool, the tool including a body capable of supporting a blade portion, the body also capable of receiving one end of a substantially elongate protecting apparatus, the protecting apparatus being adapted at its forward distal end to contact a portion of the surface to be cut by the blade portion, the protecting apparatus also including alignment means to maintain alignment of the blade portion relative to the surface being cut, the tool also including resilience means to facilitate displacement of the protecting apparatus relative to the position of the blade portion when in use, and the body also including a handle.

According to another aspect of the present invention there is provided a tool substantially as described above wherein displacement of the protecting apparatus relative to the blade portion is effected in conjunction with resilience means via forward pressure applied to the tool by the user resulting in the abutting means contacting a surface to be cut being pushed rearwardly to expose the cutting edge of the blade portion.

According to another aspect of the present invention there is provided a tool substantially as described above wherein the resilience means is attached at one end to a portion of the body, and at the other end towards the rearward end of the protecting apparatus.

Accordingly to another aspect of the present invention there is provided a tool substantially as described above wherein the blade portion includes any one of a standard saw blade and an awl capable of being used with the tool and replaced when damaged or worn, said saw blade including at least one of a hacksaw blade, drag saw blade, or cross-cut saw blade.

According to another aspect of the present invention there is provided a tool substantially as described above wherein the protecting apparatus includes gauging apparatus capable of being pre-set prior to use of the tool to ensure the cut effected by the blade portion does not exceed that required.

The term blade portion shall mean, but is not limited to any portion of a tool capable of effecting the required change in a surface with which the tool is used. For example, the blade portion may be a saw blade to effect a cut, or an awl shaft or drill bit to effect a hole, and so forth. However, the blade portion may also be or include a measurement scale, and so forth.

For ease of reference one embodiment of the tool in the form of a cutting tool incorporating a saw blade, shall now be described. However, it should be appreciated that reference to a cutting tool or a saw blade is not intended to limit this specification. Accordingly, the description may be generally applicable to a hole-punch tool where the blade portion is an awl, or any other such tool to which the features of this invention may be applied.

In preferred embodiments of the present invention the handle portion of the body is displaced at one distal end of the tool and is oriented in a plane substantially perpendicular to the plane of orientation of the blade portion and the protecting apparatus. Preferably the handle is moulded to enable it to be comfortably gripped within the user's palm. Preferably, the contoured handle portion can be adapted so that it can be gripped comfortably by both left-handed and/or right-handed people.

Anterior to the handle the main portion of the body is configured to receive the protecting apparatus, the resilience means and the blade portion. There is also provision to receive a cover plate that can be removed as required to repair to and/or replacement of the resilience means and/or the blade portion and/or the protecting apparatus when these become broken or worn. Alternatively, the handle portion may pivot open to enable access to its interior to enable repair to and/or replacement of the resilience means and/or the blade portion and/or the protecting apparatus as required.

A transverse groove is preferably cut into the interior face of the main upper body portion to enable the substantially elongate protecting apparatus to slide within the groove in a substantially horizontal plane.

The groove preferably transverses the width of the body to ensure unhindered sliding movement of the protecting apparatus. Above the slide groove is located attachment points to which one end of resilience means, such as a spring, is capable of being attached. An attached resilience means, such as a spring or any other suitable resilience means, is thus configured to preferably lie in a substantially parallel plane to the plane of alignment of the protecting apparatus. Although any suitable attachment site for one end of the resilience mans, may be utilised as required.

Whilst one end of the resilience means (spring) is attached to the body, the opposite distal end of the spring is preferably attached to an attachment point (or lug). The lug is preferably positioned at the rearward distal end of the protecting apparatus (that in use is capable of sliding through and extending beyond the rear of the body).

In other preferred embodiments, the opposite distal end of the spring is preferably attached to an attachment point preferably positioned at a point within the handle, so that the attachment point on the protecting apparatus is substantially hidden from view.

Preferably adjacent (or above) the position of the resilience means the body is configured to receive a portion of a blade. Again the blade is preferably aligned in a substantially parallel arrangement to the protecting apparatus and the resilience means.

Where the blade is a saw blade its position, although displaced in distance from the protecting apparatus and the resilience means, is such that when the blade is assembled onto the body the teeth of the blade are oriented downwards towards the protecting apparatus.

The blade is preferably inserted in to a suitably configured cavity in the body. The blade is further maintained in the cavity by securing means in the form of a screw threaded lug, or bolt which can be turned to apply pressure to part of the blade.

The securing means is preferably located on the upper exterior surface of the body and is able to co-operate with the blade via a channel through the upper body, through which a shaft of the securing means can pass. In one embodiment the means for securing the blade into a preferred position also contributes to securing a cover plate of the tool in place.

However, any suitable arrangement and location of such securing means for securing the blade in place, may be employed with this invention. For example, the securing means may be located on the upper, but external surface of the handle/body and enables the blade to be secured into a preferred position whilst contributing to securing one half (or portion) of the handle/body of the tool in place relative to the remainder of the handle.

Once assembled the protecting apparatus, resilience means, and blade are maintained in their appropriate position by a cover plate removably attached to the body. Alternatively, the handle may be in two halves longitudinally. Positioning and securing one half to the other in such embodiments ensures that when the handle is assembled the protecting apparatus, resilience means, and blade are maintained in their appropriate position.

Preferably the cover plate (or portion or half of the handle/body) is suitably configured to complement the corresponding configuration of the body and the protecting apparatus, the resilience means and the blade to maintain them in their preferred locations.

An advantage of the cover plate of the present invention is that it can be easily removed to replace any worn springs, to lubricate the protecting apparatus to facilitate its sliding in the slide groove of the body, and to facilitate replacement of damaged or worn blades.

In one preferred embodiment, the cover plate may be totally detachable from the tool when required by undoing appropriate attachment means, such as screws, spring clips and so forth, and or the securing means of the blade.

In other embodiments the cover plate may remain attached to the body by hinging means, so that when the attachment means are undone or released, the cover plate is simply pivoted to expose the interior face of the body. Any combination of removable plates and hinged portions of the body/handle, in part or in its entirety, may also be employed.

In preferred embodiments of the present invention the protecting apparatus is a substantially elongate member extending in a substantially perpendicular plane to the body of the tool. The member is preferably substantially uniform in dimension along its length. The length of the member is determined by the length of the blade of the tool. The length preferably is such that none of the cutting edge of the blade is exposed when the tool is not in use.

Extending in a substantially vertical plane from the upper surface of the rearward distal end of the member is a projection or lug. It is to this projection that the rearward distal end of the resilience means is attached. However, in other embodiments, the projection may extend from either side or furthermost end face of the member. Alternatively, as discussed above, the lug or point of attachment of the spring to the protective apparatus may be substantially hidden within the body/handle portion of the tool.

The lug may be permanently affixed to the elongate member, or may be removable to enable the elongate member of the protecting apparatus to be slid out of and into the groove of the body for maintenance, without having to remove the cover plate.

Whilst the rearward distal end of the member co-operates with and slides within the groove of the body of the tool, the forward distal end is configured to include a alignment means in the form of a blade guide and an optional abutment means.

Both the blade guide and the abutment means extend from the member in a substantially perpendicular plane. The blade guide projects substantially above the member of the protecting apparatus, whilst the abutment means substantially depends from the member of the protecting apparatus.

The abutment means and the blade guide are preferably positioned at the most forward end of the member. However, in other embodiments the blade guide may be positioned posteriorly to the point of attachment of the abutment means.

The blade guide is preferably configured to include a vertical face, at the top of which is a substantially U-shaped portion. The U-shaped cavity created is capable of enclosing at least a portion of the body of the blade therein, but does not grip the blade. Rather, the blade guide preferably ensures the blade cannot move laterally to the line of cutting action. Accordingly, the likelihood of the blade breaking is reduced, and the maintenance of the blade in preferred alignment to effect a cut is achieved.

The abutment means includes a portion, the face of which abuts at least a portion of the surface of the object being cut. This abutting face provides a means of further supporting the tool relative to the surface of the structure during the cutting action.

The abutting face also enables a more substantially equal force to be applied to effect sliding of the protecting apparatus rearwardly towards the body of the tool thereby exposing only the preferred amount of the blade's cutting edge needed to effect the cut required in the surface of the object being cut.

The abutting face can take any appropriate shape and can be removably attached to the abutment means. For example, when the object to be cut is circular, such as a pipe, only a portion of the circumference of the pipe may contact a flat abutting face. Therefore, an appropriately configured abutting face is preferably used to extend the point of contact of the abutment means with the object.

In preferred embodiments of the present invention the elongate member of the protecting apparatus also includes multiple apertures distributed along its length. The multiple apertures are capable of receiving a stop. The stop can take any appropriate shape to effect the required function. The positioning of the stop along the length of the member effectively operates as a depth gauge thereby preventing the protecting apparatus from sliding too far through the body and exposing too much of the cutting edge or shaft of the blade.

Accordingly, by appropriately positioning the stop along the member of the protecting apparatus the width (or depth depending on the blade and the tool) of the cut into the surface can be controlled, without having to rely on the individual user's judgement alone. Greater control of the cut is thereby effected. The stop may be attached to the elongate member either anterior to or posterior to the handle.

It is preferable that the blade guide, the abutment means and the elongate member of the protecting apparatus may be made of metal for durability and strength. However, other materials such as plastics materials, fibre glass and so forth may be employed.

The blade is typically metal, although the cutting edge may have hardened chrome, tungsten coated, diamond edged or so forth to improve the ability of the tool to cut into a particular surface. As mentioned previously, in one embodiment of the invention, the cutting tool is adapted to receive standard hacksaw blades, drag saw blades and crosscut saw blades. However, the blades or other cutting apparatus may be specifically configured for this tool.

The body, including the cover plate and handle portion may be made of plastics materials (including reinforced plastics materials), fibre glass, metal, wood and so forth, as can the stop. However, as can be appreciated the various parts of the cutting tool can be made of any material suited to its required use.

Whilst the invention is preferably applied to a hand held, manually controlled tool, the invention may be adapted to include or be connectable to a power source. The latter embodiment may be particularly relevant where a drill bit is used as the blade portion.

BRIEF DESCRIPTION OF DRAWINGS

Further aspects of the present invention will become apparent from the following description that is given by way of example only and with reference to the accompanying drawings in which.

BEST MODES FOR CARRYING OUT THE INVENTION

Figure 1:
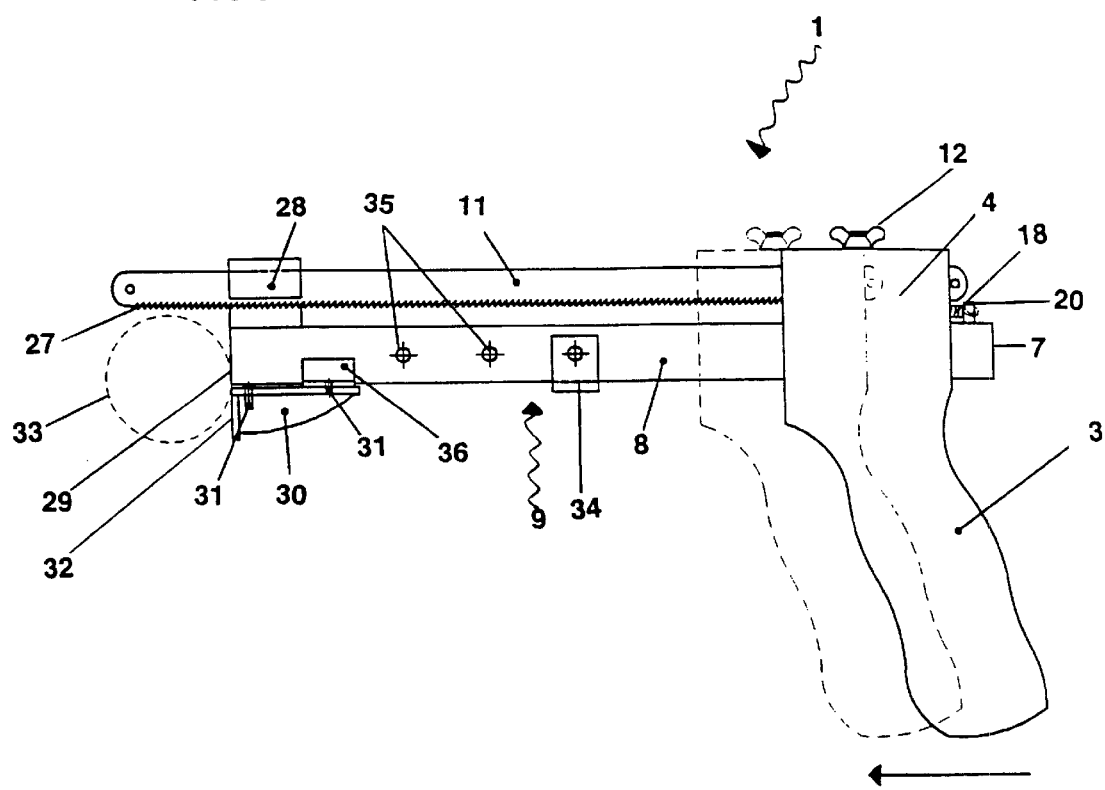
FIG. 1 is a side view of the tool in accordance with one embodiment of the present invention.

With reference to the diagrams by way of example only there is provided a tool generally indicated by arrow 1. The tool (1) as shown in FIGS. 1 through 8 is a cutting tool that is essentially an improved hacksaw. The tool (1) includes a body generally indicated by arrow 2. The body (2) includes a handle portion (3) and a main upper body portion (4).

Figure 2:
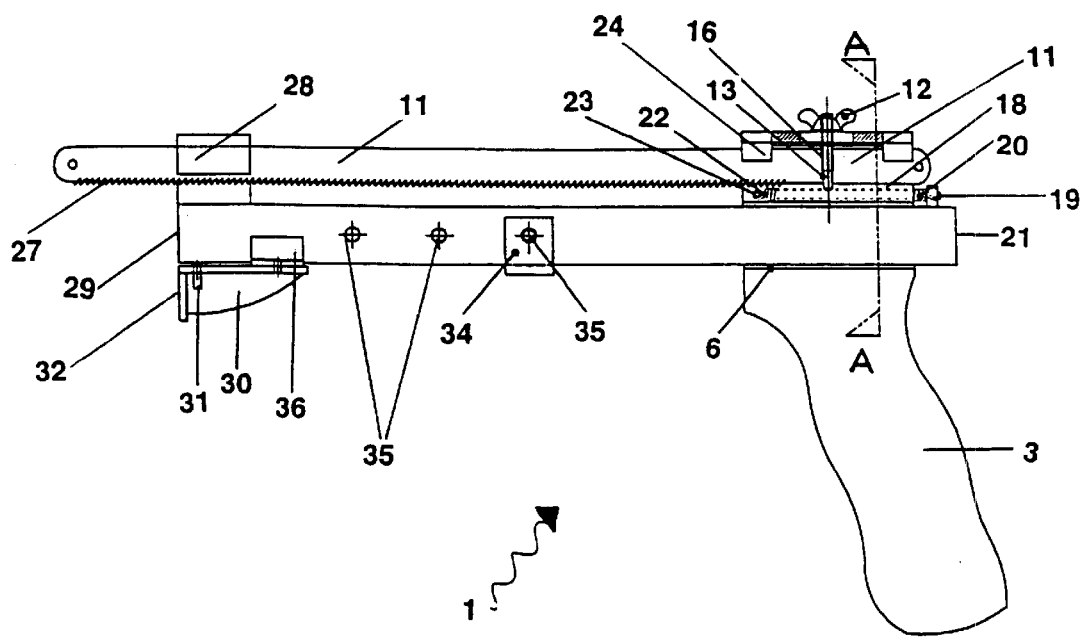
FIG. 2 illustrates a cross-sectional side view through the body of the tool showing the arrangement of the member, resilience means, saw blade and attachment apparatus in accordance with one embodiment of the present invention.
Figure 3:
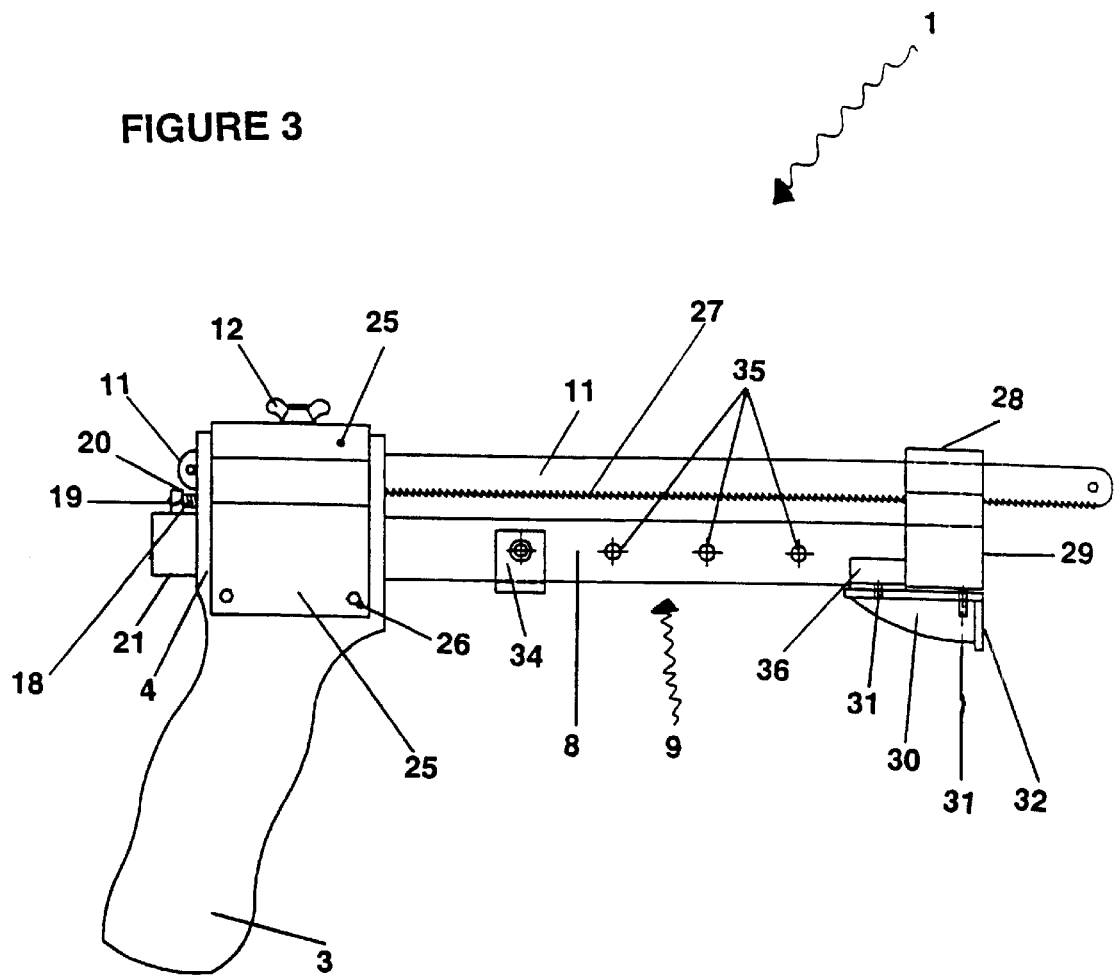
FIG. 3 is an opposite side view of the tool showing the location of the cover plate on the body of the tool in accordance with one embodiment of the present invention.

As shown in FIGS. 1, 2 and 3, the handle (3) is designed to be gripped by the user's hand and is appropriately contoured to enable the handle (3) to be comfortably held within the palm and fingers/thumb of the hand.

Figure 4:
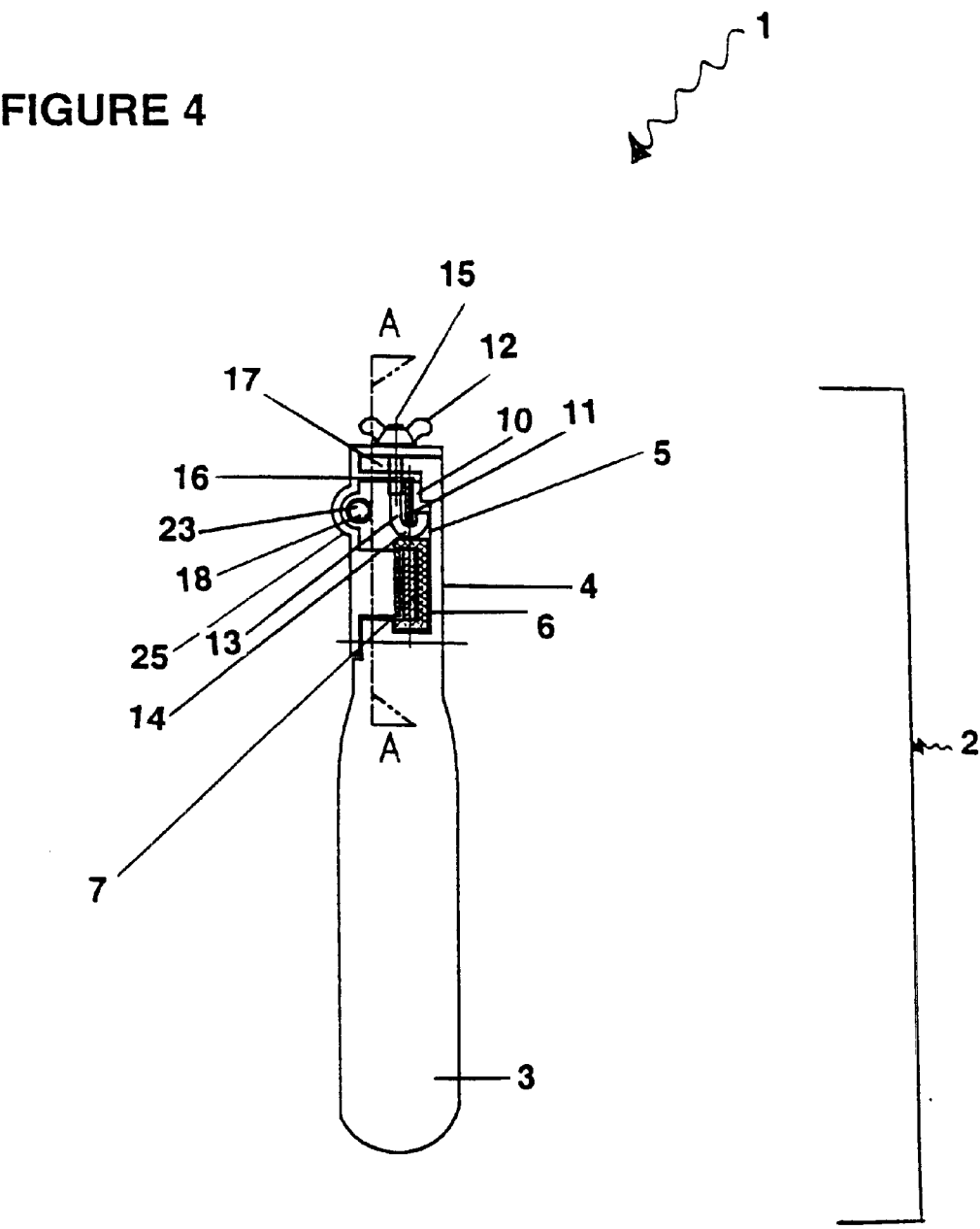
FIG. 4 is an end cross-sectional view through the body showing the relative position of the member of the protecting apparatus, the position of the resilience apparatus, and the position of the blade being maintained in the required orientation by the cover plate, the securing apparatus and the attachment apparatus.

As shown in FIG. 4 the interior surface (5) of the main upper body portion (4), is configured to include a slide groove (6) capable of receiving one distal end (7) of the elongate member (8) of the protecting apparatus generally indicated by arrow 9.

The interior surface (5) of the main body portion (4) is also configured at (10) to receive a portion of a saw blade (11). Other embodiments may replace the saw blade with an awl, or some other suitable blade portion.

The saw blade (11) is maintained firmly in place within the body (4) by pressure applied to the saw blade (11) by securing apparatus (12). The securing apparatus (12) includes a shaft (13), which in FIG. 4 includes a substantially U-shape portion (14) towards one of its distal ends. The opposite distal end of the shaft (13) includes a threaded portion (15) that co-operates with and is complementarily threaded to receive the securing apparatus (12) (which in FIG. 4 is a wing nut (12)). The shaft (13) is held in appropriate alignment by virtue of channel (16) depending from the upper surface (17) of the upper body portion (4).

In the embodiment of FIGS. 5 through 8, the securing apparatus (12) is a screw passing through the body and securing the blade in place (particularly shown in FIG. 6) at the same time as securing the body portions together.

In use, the blade (11) is placed within the configured cavity (10), and the U-shaped portion (14) of the shaft (13) is fed around the lower surface of the blade (11). The shaft (13) is then inserted through the channel (16) and the wing nut (12) is threaded onto the threaded portion (15) of the shaft (13) and the whole arrangement is then tightened into position.

The blade (11) is further maintained in position by appropriately located and suitably configured guides (24) (the shape being related to the blade portion shape) as shown in FIGS. 2, 5, 6 and 8.

Substantially adjacent, but displaced from both the position of the blade (11) and the position of the elongate member (8) of the protecting apparatus (9), is located resilience apparatus (18), which in the embodiment illustrated in FIGS. 1 to 4, is a spring.

As shown in FIGS. 1 through 4, one distal end (19) of the resilience apparatus (18) as attached to a lug (20) projecting from a surface of the elongate member (8) of the protecting apparatus (9). The resilience apparatus (or spring) (18) is hidden in the embodiment illustrated by FIGS. 5 through 8.

When the cutting tool (1) is assembled, the lug (20) is preferably located rearwardly of the body (2), at the most rearward distal end (21) of the elongate member (8) of the protecting apparatus (9). The opposite distal end (22) of the resilience means (18) is attached to attachment apparatus (23) within the body (2). As the spring is hidden in the embodiment of FIGS. 5 through 8, so are the points of attachment of the spring to the body and the protective apparatus.

As can be seen in FIGS. 2 and 4, the member (8), the blade (11) and the resilience apparatus (spring) (18) are all aligned in a substantially parallel alignment to each other, and lie in a substantially horizontal plane relative to the body (2).

Figure 5:
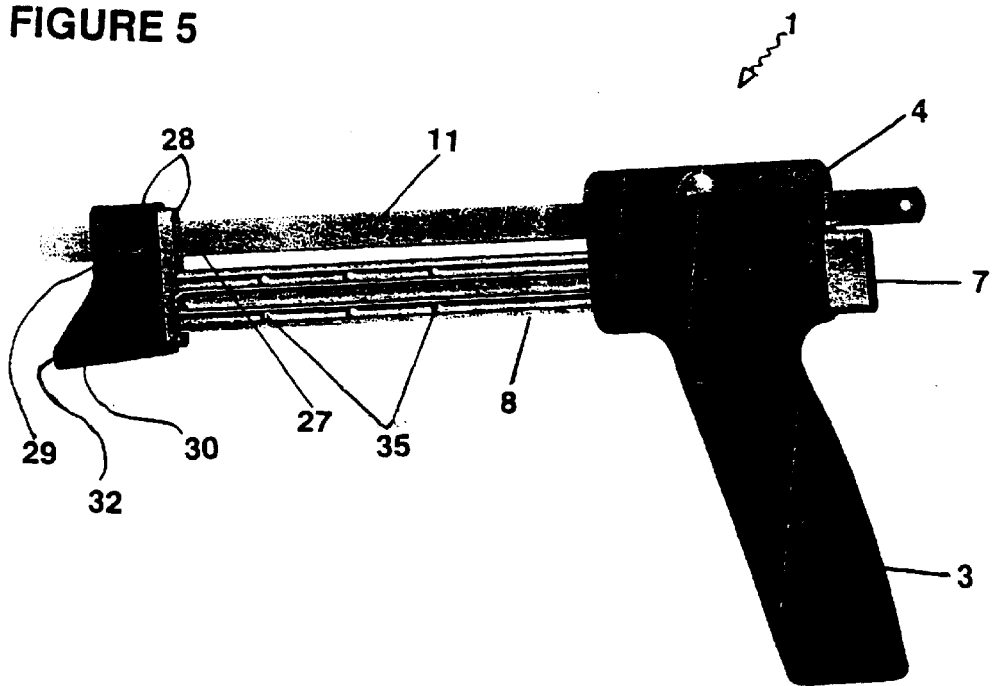
FIG. 5 is a side view of the tool in accordance with another preferred embodiment of the present invention.
Figure 6:
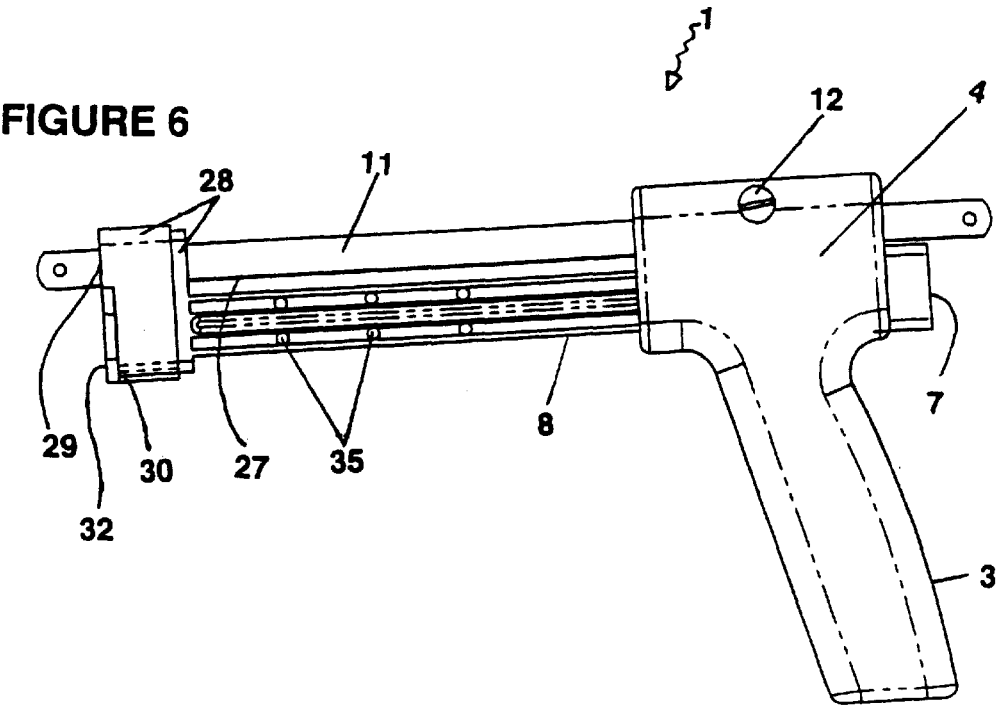
FIG. 6 is a diagrammatic side view of the tool of FIG. 5 in accordance with that preferred embodiment of the present invention.
Figure 7:
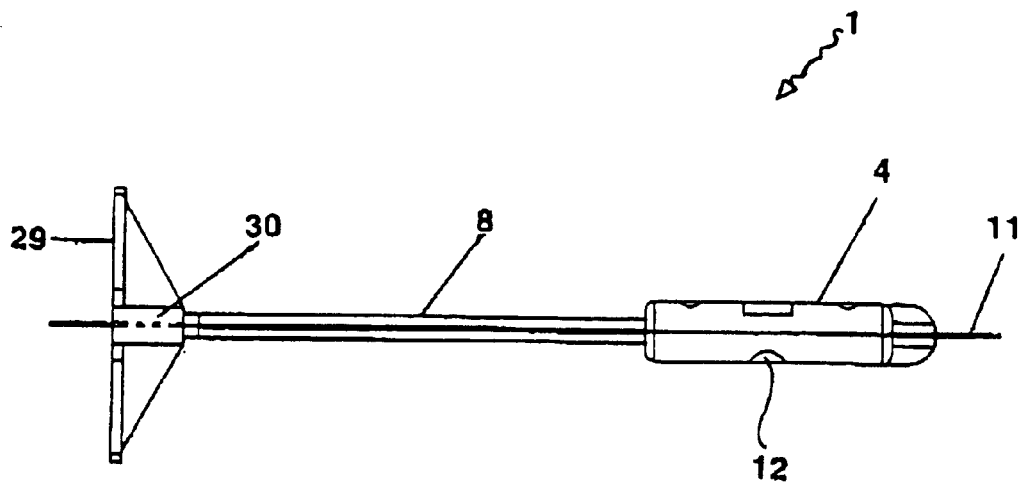
FIG. 7 is a top plan view of the tool of FIG. 5 in accordance with that preferred embodiment of the present invention.
Figure 8:
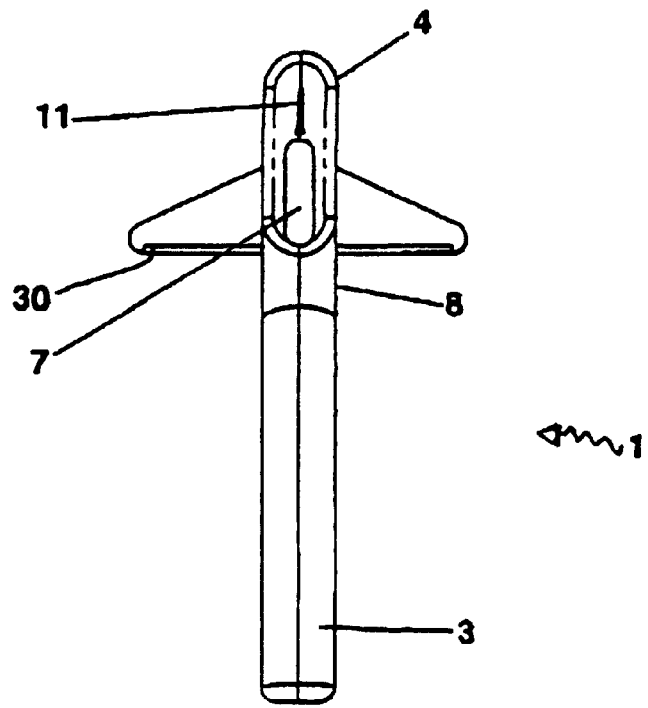
FIG. 8 is a rear plan view of the tool of FIG. 5 in accordance with that preferred embodiment of the present invention.

When the elongate member (8), spring (18) and the blade (11) are appropriately located, a cover plate (25) is secured into position against the main upper body portion (4) of the body (2), and held in place by appropriate attachment apparatus, such as screws (26). The cover plate (25) further maintains the elongate member (8), spring (18) and blade (11) in their preferred positions. Alternatively, as illustrated in FIGS. 5 and 6, an entire half of the body/handle, or a portion of the body/handle may be secured against its complementary half/portion and secured in place to maintain the blade, protective apparatus and so forth in preferred alignment. The two or more portions being secured together by securing apparatus (12) in the form of a screw or similar.

When assembled, as shown in FIGS. 1 to 8 inclusive, the blade (11) is located above the elongate member (8) of the protective apparatus (9). The saw teeth (27) are therefore guarded by the protecting apparatus (9) when the cutting tool (1) is not in use (as shown in FIGS. 1 and 5).

To ensure the blade (11) (which is only effectively secured at one end within the body (2) by virtue of the action of the securing apparatus (12)), is maintained in appropriate alignment, and to prevent it from flexing and therefore breaking in use, a blade guide (28) is employed. The blade guide (28) extends in a substantially perpendicular plane from the opposite distal end (29) of the elongate member (8) of the protecting apparatus (9). The blade guide (28) is a substantially U-shaped guide.

Extending in a substantially perpendicular plane from below the elongate member (8) of the protecting apparatus (9), is abutment means (30).

The abutment means (30) may be removably attached to the elongate member (8) by appropriate attachment means (31) as shown in FIG. 1, or be permanently attached to the elongate member as shown in FIGS. 5 and 6 where the elongate member may be made from moulded thermoplastic materials.

The anterior face (or abutting face) (32) of the abutment means (30) is configured to lie substantially in line with or forward of the most forward distal end (29) of the elongate member (8).

In some embodiments, the abutting face (32) may be appropriately configured to complement the shape of an object, such as a pipe (33) as shown in FIG. 1 (in cross-section). The abutting face (32) essentially extends the point of contact of the forward distal end (29) of the elongate member (8) with the object (33).

This contact enables a more stable alignment of the cutting tool (1) relative to the object (33), enables the user to apply more uniform forward pressure to the surface of the object (33) and enables appropriate pressure to be effected on the protecting apparatus (9) causing it to slide rearwardly relative to the blade (11) and the body (2). Accordingly, rearward displacement of the protecting apparatus (9) exposes only enough of the cutting teeth (27) of the blade (11) as required to effect the preferred width of cut to be made in the object (33).

Control of the cut width is also further effected by use of stops (34) that can be appropriately positioned along the length of the elongate member (8) at appropriate positions (35). In use, the stop (34) comes in contact with the main upper body portion (4) thereby preventing the elongate member (8) of the projecting apparatus from sliding further through the body (2).

After the cut has been effected, the lack of pressure on the abutment means (30) and/or the forward distal end (29) of the elongate member (8) no longer applies tension to the spring (18), and the elongate member (8) can then be displaced forwardly to again place the protecting apparatus (9) in a configuration where the saw teeth (27) of the saw blade (11) are no longer exposed.

The abutments means (30) may also include guiding means (36) which lie substantially adjacent to each side of the elongate member (8), thereby stabilising the abutment means (30) relative to the elongate member (8).

Aspects of the present invention have been described by way of example only and it should be appreciated that modifications and additions may be made thereto without departing from the scope thereof as defined in the appended claims.

I claim:

1. A tool comprising:

a body including a handle;

a replaceable cutting portion for cutting into a surface, said replaceable cutting portion having a rearward end mounted on the body and a forward distal end remote from the body, and wherein said replaceable cutting portion includes a substantially elongate cutting surface;

a substantially elongate protecting apparatus having a rearward end mounted on the body and a forward distal end remote from the body, the protecting apparatus being adapted at its forward distal end to contact a portion of the object surface to be cut by the replaceable cutting portion, the protecting apparatus being further positioned relative to the cutting surface of the replaceable cutting portion such that the cutting surface is guarded when the whole or part thereof is not in use;

gauging apparatus included along the exposed length of the protecting apparatus to adjustably restrict displacement of the protecting apparatus relative to the position of the replaceable cutting portion when in use to expose only as much of the cutting surface as required, said gauging apparatus being complemented by corresponding gauging apparatus optionally included on the replaceable cutting portion;

alignment means to maintain alignment of the replaceable cutting portion relative to the surface being cut, the alignment means comprising a blade guide and replaceable abutment means, said abutment means including an abutting face configured to extend the point of contact with the surface being cut; and resilience means, said resilience means adapted to facilitate displacement of the protecting apparatus relative to the position of the replaceable cutting portion when in use to further effect exposure of only as much of the cutting surface as required.

2. A tool as claimed in claim 1 wherein the replaceable cutting portion includes any one of a saw blade, an awl-shaft, usable with or adapted for use with the tool.

3. A tool as claimed in claim 2 wherein the replaceable cutting portion when a saw blade includes any one of a standard hacksaw blade, a drag saw blade, a crosscut saw blade.

4. A tool as claimed in claim 2 wherein the body is also configured to include either or both a cover plate and interconnectable portions to enable access as required to repair and/or replace and/or lubricate the replaceable cutting portion, as and when the replaceable cutting portion becomes damaged or worn.

5. A tool substantially as claimed in claim 1 wherein displacement of the protecting apparatus relative to the replaceable cutting portion is effected in conjunction with the resilience means by the user applying forward pressure against the protective apparatus at its forward distal end where the protective apparatus contacts the surface to be cut thereby effecting rearward, longitudinal movement of the protective apparatus and tension of the resilience means, to expose the cutting edge of the replaceable cutting portion.

6. A tool as claimed in claim 5 wherein the resilience means is attached at one end to a portion of the body, and at the other end towards the rearward end of the protecting apparatus.

7. A tool substantially as claimed in claim 5 wherein the forward distal end of the protective apparatus, where the protective apparatus contacts the surface to be cut, includes abutting means.

8. A tool as claimed in claim 1 wherein the gauging apparatus is capable of being pre-set prior to use of the tool.

9. A tool as claimed in claim 8 wherein the gauging apparatus when pre-set determines a pre-set distance by which the replaceable cutting portion may effect a cut into the surface, but ensures the cut effected by the replaceable cutting portion does not exceed that required.

10. A tool as claimed in claim 9 wherein the gauging apparatus includes a measurement scale.

11. A tool as claimed in claim 10 wherein a measurement scale of the gauging apparatus of the protective apparatus is complemented by a measurement scale optionally included on the replaceable cutting portion.

12. A tool as claimed in claim 1 wherein the body is displaced at one distal end of the tool and is oriented in the same plane as the replaceable cutting portion and the protecting apparatus.

13. A tool as claimed in claim 4 wherein the body configured to include either or both a cover plate and interconnectable portions also enables access as required to repair and/or replace and/or lubricate any one of the resilience means, the protecting apparatus, as and when any of these become broken or worn.

14. A tool as claimed in claim 13 wherein either or both the cover plate and interconnectable portions of the body includes an upper, transverse groove in its internal surface to enable the substantially elongate protecting apparatus to slide within said groove in a substantially horizontal plane to effect the substantially unhindered sliding movement of the protecting apparatus therein.

15. A tool as claimed in claim 14 wherein the internal surface of the body which includes the upper, transverse groove also includes at least one attachment point to which one end of the resilience means is attachable.

16. A tool as claimed in claim 15 wherein the resilience means when attached to said attachment point is such that the resilience means is configured to lie in a substantially parallel plane to the plane of alignment of the protecting apparatus.

17. A tool as claimed in claim 16 wherein the opposite distal end of the resilience means is attachable to an attachment point positioned towards the rear distal end of the protecting apparatus.

18. A tool as claimed in claim 17 wherein the resilience mean is a spring.

19. A tool as claimed in claim 14 wherein either or both the cover plate and interconnectable portions of the upper body are configured on their internal surface include a cavity to receive a section of the replaceable cutting portion, such that the replaceable cutting portion is positioned adjacent, or above the position of attachment and alignment of the resilience means.

20. A tool as claimed in claim 19 wherein the replaceable cutting portion when positioned relative to the body, is also aligned in a substantially parallel arrangement to the alignment of the protecting apparatus and the resilience means, although displaced in distance from the protecting apparatus and the resilience means.

21. A tool as claimed in claim 20 wherein the replaceable cutting portion when it is inserted into a suitably configured cavity in the body is maintained in position by securing means including any one of a screw threaded lug, bolt, capable of applying securing pressure to at least a part of the replaceable cutting portion.

22. A tool as claimed in claim 21 wherein where the replaceable cutting portion is a saw blade, the saw blade is assembled relative to the body such that the teeth of the saw blade are oriented downwards toward the protecting apparatus.

23. A tool as claimed in claim 21 wherein the securing means is able to cooperate with the replaceable cutting portion via a channel through the upper exterior surface of the body and through which a shaft of the securing means can pass.

24. A tool as claimed in claim 23 wherein the means for securing the replaceable cutting portion into a preferred position also contributes to securing either or both the cover plate and the interconnectable body portions of the tool in place.

25. A tool as claimed in claim 24 wherein either or both the cover plate and the interconnectable body portions may be pivotally attached by appropriate hinging means to enable ready access to the interior of the body.

26. A tool as claimed in claim 1 wherein the handle portion is contoured to effect comfortable gripping of the handle portion in the user's palm.

27. A tool as claimed in claim 1 wherein the length of the protecting apparatus is determined substantially by the length of the replaceable cutting portion of the tool, such that none of the cutting edge of the replaceable cutting portion is exposed when the in use.

28. A tool as claimed in claim 14 wherein the protecting apparatus also optionally includes a projection at its rearward distal end, which when removed enables the protecting apparatus to be slid out of and into the internal groove of the body as required, enabling removal of the protecting apparatus for repair, without having to remove the cover plate or separate the interconnectable body portions.

29. A tool as claimed in claim 1 wherein the alignment means in the form of a guide for the replaceable cutting portion and optionally removeable abutment means is located towards the forward distal end of the protecting apparatus.

30. A tool as claimed in claim 29 wherein the guide is oriented substantially perpendicular to the longitudinal axis of the protecting apparatus, projecting upwards from the longitudinal axis of the protecting apparatus.

31. A tool as claimed in claim 29 wherein the abutment means is oriented substantially perpendicular to the longitudinal axis of the protecting apparatus, but depends (down) from the longitudinal axis of the protecting apparatus.

32. A tool as claimed in claim 31 wherein the guide for the replaceable cutting portion is configured to include a vertical face, to the top of which is a substantially inverted U-shaped portion creating a cavity capable of enclosing at least a portion of the body of the replaceable cutting portion therein, but without gripping the replaceable cutting portion.

33. A tool as claimed in claim 32 wherein the guide for the replaceable cutting portion restricts lateral movement of the replaceable cutting portion relative to the line of cutting action thereby minimizing breakage of the replaceable cutting portion, yet maintaining the replaceable cutting portion in preferred alignment to effect a preferred cut.

34. A tool as claimed in claim 31 wherein the abutment means includes an abutting portion, the face of which abuts at least a portion of the surface of the object being cut to effect further support of the tool relative to the surface of the structure during the cutting action.

35. A tool as claimed claim 34 wherein the abutting face, when pushed against the surface of the object being cut, enables a substantially rearward force to be applied to the abutting face to effect sliding of the protecting apparatus rearwardly to and towards the body of the tool, thereby exposing a preferred amount of the cutting edge of the replaceable cutting portion to effect the cut required in the surface of the object being cut.

36. A tool as claimed in claim 34 wherein the abutting face is optionally configured to complement the configuration of the object being cut to ensure optimum contact between the abutting face and the object surface.

37. A tool as claimed in claim 29 wherein the gauging apparatus of the protecting apparatus optionally includes multiple apertures distributed along the exposed length of the protecting apparatus.

38. A tool as claimed in claim 37 wherein said multiple apertures are configured to receive complementarily configured stops which when positioned in the apertures prevents the protecting apparatus sliding too far through the body and exposing too much of the cutting edge of the replaceable cutting portion, thereby effecting control of the cut into the surface.

39. A method of manufacturing a tool, said tool comprising:

a body including a handle;

a replaceable cutting portion for cutting into a surface, said replaceable cutting portion having a rearward end mounted on the body and a forward distal end remote from the body, and wherein said replaceable cutting portion includes a substantially elongate cutting surface;

a substantially elongate protecting apparatus having a rearward end mounted on the body and a forward distal end remote from the body, the protecting apparatus being adapted at its forward distal end to contact a portion of the object surface to be cut by the replaceable cutting portion, the protecting apparatus being further positioned relative to the cutting surface of the replaceable cutting portion such that the cutting surface is guarded when the whole or part thereof is not in use;

gauging apparatus included along the exposed length of the protecting apparatus to adjustably restrict displacement of the protecting apparatus relative to the position of the replaceable cutting portion when in use to expose only as much of the cutting surface as required, said gauging apparatus being complemented by corresponding gauging apparatus optionally included on the replaceable cutting portion;

alignment means to maintain alignment of the replaceable cutting portion relative to the surface being cut, the alignment means comprising a guide for the cutting portion and replaceable abutment means, said abutment means including an abutting face configured to extend the point of contact with the surface being cut; and resilience means, said resilience means adapted to facilitate displacement of the protecting apparatus relative to the position of the replaceable cutting portion when in use to further effect exposure of only as much of the cutting surface as required, said method including the steps of:

a) manufacturing a body, said body including at least two portions capable of being interconnected and said body portion(s) being configured in at least part of its internal surface to receive replaceable cutting portion, protecting apparatus and resilience means;

b) manufacturing protecting apparatus, said protecting apparatus being configured to complement the dimensions of the replaceable cutting portion, and attaching or including provision to attach the alignment means to said protecting apparatus at its leading distal edge to effect abutment of the abutment means against the surface of the object to be cut and alignment of the replaceable cutting portion by the guide as required during the cutting action of the replaceable cutting portion;

c) attaching one distal end of the resilience means to an internal surface of the body and the opposite distal end towards the rearward end of the protective apparatus;

d) aligning the replaceable cutting portion relative to the protecting apparatus;

e) positioning the replaceable cutting portion and protecting apparatus relative to the internal surface(s) of the body portions; and f) securing the body portions and the enclosed replaceable cutting portion, protecting apparatus and resilience means in place using securing apparatus; and the method characterized in that the resilience means of the tool facilitates displacement of the protecting apparatus relative to the position of the replaceable cutting portion to expose only enough of the cutting surface of the replaceable cutting portion as required to effect a preferred depth of cut in the surface of an object, said amount of exposed cutting surface being adjustable via the gauging apparatus included along the exposed length of the protecting apparatus.

40. A method of assembling a tool, said tool comprising:

a body including a handle;

a replaceable cutting portion for cutting into a surface, said replaceable cutting portion having a rearward end mounted on the body and a forward distal end remote from the body, and wherein said replaceable cutting portion includes a substantially elongate cutting surface;

a substantially elongate protecting apparatus having a rearward end mounted on the body and a forward distal end remote from the body, the protecting apparatus being adapted at its forward distal end to contact a portion of the object surface to be cut by the replaceable cutting portion, the protecting apparatus being further positioned relative to the cutting surface of the replaceable cutting portion such that the cutting surface is guarded when the whole or part thereof is not in use;

gauging apparatus included along the exposed length of the protecting apparatus to adjustably restrict displacement of the protecting apparatus relative to the position of the replaceable cutting portion when in use to expose only as much of the cutting surface as required, said gauging apparatus being complemented by corresponding gauging apparatus optionally included on the replaceable cutting portion;

alignment means to maintain alignment of the replaceable cutting portion relative to the surface being cut, the alignment means comprising a guide for the cutting portion and replaceable abutment means, said abutment means including an abutting face configured to extend the point of contact with the surface being cut; and resilience means, said resilience means adapted to facilitate displacement of the protecting apparatus relative to the position of the replaceable cutting portion when in use to further effect exposure of only as much of the cutting surface as required, said method including the steps of:

a) taking at least two portions capable of being interconnected to form the body and said body portion(s) being configured in at least part of an internal surface to receive a replaceable cutting portion, protecting apparatus and resilience means; and b) feeding the replaceable cutting portion into the alignment means of the protecting apparatus, said protecting apparatus being configured to complement the dimensions of the replaceable cutting portion; and c) attaching one distal end of the resilience means to an internal surface of the body and the opposite distal end towards the rearward end of the protective apparatus; and d) positioning the replaceable cutting portion and protecting apparatus with the resilience means relative to the internal surface(s) of the body portions; and e) securing the body portions together with securing means such that the enclosed replaceable cutting portion, protecting apparatus and resilience means are also secured in place.

* * * * *